(12) United States Patent
Weickert

(10) Patent No.: US 7,948,229 B2
(45) Date of Patent: May 24, 2011

(54) HIGH TEMPERATURE ELECTRONICS FOR PASSIVE EDDY CURRENT SENSORS

(75) Inventor: John Weickert, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 12/201,356

(22) Filed: Aug. 29, 2008

(65) Prior Publication Data

US 2010/0052659 A1 Mar. 4, 2010

(51) Int. Cl.
   *G01P 3/46* (2006.01)
   *G01B 7/30* (2006.01)
(52) U.S. Cl. .................... 324/164; 324/207.25
(58) Field of Classification Search .......... 324/164, 324/207.25; 73/514.16, 514.31
   See application file for complete search history.

(56) References Cited

U.S. PATENT DOCUMENTS

| | | | |
|---|---|---|---|
| 3,932,813 | A | 1/1976 | Gallant |
| 3,961,214 | A | 6/1976 | Lokkart |
| 4,937,522 | A | 6/1990 | Gee |
| 4,967,153 | A | 10/1990 | Langley |
| 5,012,207 | A | 4/1991 | Edwards |
| 5,373,234 | A | 12/1994 | Kulczyk |
| 5,761,956 | A | 6/1998 | Beeson et al. |
| 6,208,135 | B1 | 3/2001 | Shattil |
| 6,483,293 | B1 | 11/2002 | Chen et al. |
| 6,927,567 | B1 | 8/2005 | Roeseler et al. |
| 7,170,284 | B2 | 1/2007 | Roeseler et al. |
| 2002/0145419 | A1 | 10/2002 | Luetzow et al. |
| 2005/0127905 | A1 | 6/2005 | Proctor et al. |
| 2008/0079445 | A1 | 4/2008 | May |

FOREIGN PATENT DOCUMENTS

FR 2288313 5/1976

OTHER PUBLICATIONS

Honeywell: "Datasheet: High Temperature Quad Operational Amplifer HT1104"; Apr. 1998, pp. 1-8, XP002554399.

*Primary Examiner* — Bot L LeDynh
(74) *Attorney, Agent, or Firm* — William Scott Andes; Gary M. Hartman; Domenica N. S. Hartman

(57) ABSTRACT

A system and method for sensing the periodic proximity of one or more objects, such as the rotating blades of a gas turbine. The system includes a passive eddy current sensing unit having first and second magnets and first and second coil-wound cores coupled to generate and detect first and second magnetic fields. The sensing unit is positioned relative to the object such that the first and second coil-wound cores produce outputs in response to the object periodically passing through the first and second magnetic fields, respectively. Circuitry electronically combines the outputs of the first and second coil-wound cores to produce output signals corresponding to the proximity and timing of the object as it periodically passes through the first and second magnetic fields. Electromagnetic interference noise present in the outputs of the first and second coil-wound cores is eliminated from the output signals of the circuitry.

20 Claims, 3 Drawing Sheets

HIGH TEMPERATURE ELECTRONICS FOR PASSIVE EDDY CURRENT SENSORS

BACKGROUND OF THE INVENTION

The present invention generally relates to electronic equipment, and more particularly to a system that utilizes passive eddy current speed/rotation sensors to sense rotating equipment, such as blades of a gas turbine.

Passive eddy current sensors (also known as variable reluctance sensors) have been employed in a wide variety of applications to sense the proximity and speed of rotating equipment, including blades (buckets) of gas turbines. The clearance between turbine blade tips and the shroud surrounding them varies depending on the temperatures of the blades and shroud, with greater clearances occurring at startup or otherwise when the engine is cooler. Improved control of a gas turbine engine can be achieved by monitoring the clearance between the shroud and blade tips, as well as the rotational speed of the blades. The output of a passive eddy current sensor (or other suitable proximity sensor) positioned to sense blade rotation and blade-shroud clearance can be used to modify the engine operation and/or, if so equipped, control the shroud to maintain a desired blade-shroud clearance.

Passive eddy current sensors typically contain one or more permanent magnets adjacent one or more ferromagnetic cores wound with a wire coil. The permanent magnet is typically formed of a high magnetic energy product material, such as iron-rare earth metal alloys (for example, Nd—Fe—B) and samarium alloys (for example, Sm—Co). The core is typically formed of a magnetic material, such as a magnetic steel, though other suitable magnetic materials including low carbon steels may be used depending on operating conditions. When used to monitor the clearance between a shroud and blade tips, a passive eddy current sensor is mounted to maximize the electrical signal generated as each blades passes in proximity to the sensor. In particular, the sensor is oriented so that, in the absence of a blade, magnetic flux is directed through one end of the magnet and toward the turbine rotor and its blades, then arcs back through space to the ferromagnetic core. When a blade passes through the magnetic field, eddy currents form in the blade material and the local magnetic field shifts, producing a voltage potential across the leads of the coil. Because engine casings are typically formed largely of titanium, nickel, and other nonferrous materials that exhibit low magnetic reluctance, the ends or the magnet and core are not required to be inserted entirely through the engine casing, but instead can be mounted in an external recess in the wall such that a portion of the wall separates the sensor for the hot gas path of the engine.

In modern gas turbine engines, the output of a passive eddy current sensor used to monitor blade rotation and/or blade-shroud clearance is delivered to the engine's FADEC (full authority digital engine control) through appropriate connectors and wiring. To some degree, passive eddy current sensors and any electronics associated therewith (for example, signal processing circuitry) are subjected to the harsh environment of the gas turbine, including high temperatures and electromagnetic radiation. Electronics are typically limited to about 125° C., and consequently must be cooled if located in proximity to a passive eddy current sensor. U.S. Pat. No. 7,170,284 to Roeseler et al. is an example. In addition, passive eddy current sensors are susceptible to electromagnetic interference (EMI) noise due to the many turns of wire typically present and required in the construction of their cores. Testing of passive eddy current sensors employing multiple coils with a simple wire connection between coils has shown that the combined resistance and inductance of the wire and coils are too great for the sensor to have sufficient bandwidth to accurately perform the desired sensing task.

BRIEF DESCRIPTION OF THE INVENTION

The present invention provides a system and method suitable for sensing the periodic proximity of an object, for example, one or more moving objects such as the rotating blades of a gas turbine.

According to a first aspect of the invention, the system includes a passive eddy current sensing unit comprising a first magnet and a first coil-wound core coupled to generate and detect a first magnetic field, and a second magnet and a second coil-wound core coupled to generate and detect a second magnetic field. The sensing unit is positioned relative to the object such that the object periodically passes through the first and second magnetic fields, and the first and second coil-wound cores producing outputs in response to the object periodically passing through the first and second magnetic fields. Circuitry is coupled to the sensing unit and electronically combines the outputs of the first and second coil-wound cores to produce output signals corresponding to the proximity and timing of the object as it periodically passes through the first and second magnetic fields. The circuitry combines the outputs of the first and second coil-wound cores so that common mode signals thereof subtract from each other to eliminate from the output signals of the circuitry any electromagnetic interference noise present in the outputs of the first and second coil-wound cores.

According to a second aspect of the invention, the method includes locating the passive eddy current sensing unit in proximity to the object such that the object periodically passes through the first and second magnetic fields and the first and second coil-wound cores produce outputs in response to the object periodically passing through the first and second magnetic fields. The outputs of the first and second coil-wound cores are then electronically combined with the circuitry to produce output signals corresponding to the proximity and timing of the object as it periodically passes through the first and second magnetic fields. The circuitry combines the outputs of the first and second coil-wound cores so that common mode signals thereof subtract from each other to eliminate from the output signals of the circuitry any electromagnetic interference noise present in the outputs of the first and second coil-wound cores.

According to a preferred aspect of the invention, the object may comprise multiple rotating blades of a gas turbine, the system is a blade proximity sensor system installed on the gas turbine, and the sensing unit is located in proximity to the rotating blades. In this role, the circuitry sufficiently eliminates the effect of EMI present in the operating environment of the gas turbine to enable the sensor unit to accurately perform the task of sensing the proximity of the rotating blades. According to other preferred aspects of the invention, the circuitry can operate and survive at temperatures exceeding 125° C., and though the sensing unit and its circuitry are subjected to high temperatures within the operating environment of a gas turbine, active cooling of the circuitry is not required.

Other objects and advantages of this invention will be better appreciated from the following detailed description.

DETAILED DESCRIPTION OF THE INVENTION

Figure 1:
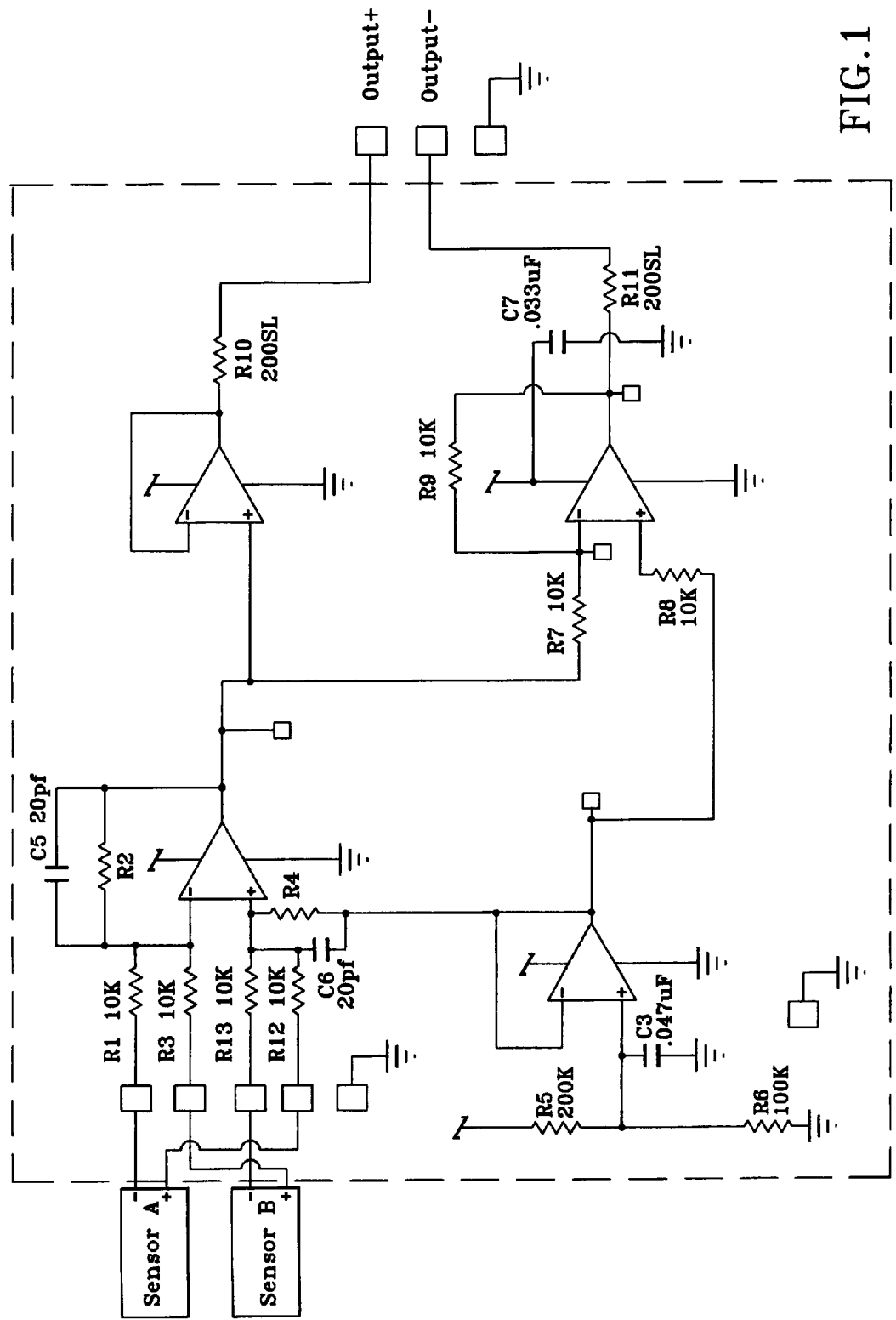
FIG. 1 is an electrical schematic showing two passive eddy current sensors coupled to circuitry that electronically combines the outputs of the sensors to reduce or eliminate electromagnetic interference noise.

FIG. 1 is an electrical schematic of a sensing system 10 containing two passive eddy current sensors 12 ("Sensor A" and "Sensor B") coupled to circuitry 14 that electronically combines the outputs of the sensors 12 to cancel EMI noise from the outputs of the sensors 12. The system 10 and sensors 12 will be discussed as particularly well suited for sensing the proximity and speed of rotating equipment, such as blades (buckets) of gas turbines, though other applications are foreseeable. After being conditioned by the circuitry 14, output signals 16 processed by the circuitry 14 and originating from one of the sensors 12 can be delivered to the FADEC or other control system (not shown) of a gas turbine engine to improve the operation of the engine through monitoring of the clearance between the turbine blade tips and the shroud surrounding them, as well as the rotational speed of the blades.

Each sensor 12 may contain one or more permanent magnets adjacent one or more ferromagnetic cores wound with wire coil (not shown). The permanent magnets of the sensors are preferably formed of a high magnetic energy product material, such as an iron-rare earth metal alloy (for example, Nd—Fe—B) or a samarium alloy (for example, Sm—Co), and the core is preferably formed of a magnetic material such as a magnetic steel, though the use of other materials is within the scope of the invention. As known in the art, the sensors 12 are adapted to be mounted to an engine casing so that magnetic flux is directed through one end of the magnet and toward the turbine rotor and its blades and then back to the core, such that a blade passing through the magnetic field causes a shift in the local magnetic field, producing a voltage potential across the leads of each coil. Other aspects of the sensors 12, including their construction and installation are known in the art and will not be discussed further.

The circuitry 14 represented in FIG. 1 electronically combines the outputs of the two coils of the sensors 12 so that the common mode signal in both coils subtracts from each other, eliminating EMI noise. In FIG. 1, signals from the negative lead of Sensor A and positive lead of Sensor B are combined and signals from the positive lead of Sensor A and negative lead of Sensor B are combined to serve as inputs to an amplifier. As a result, the signals generated by only one of the sensor coils resulting from a blade passes through its magnetic field are amplified by the circuitry 14 and sent to the FADEC.

The four amplifiers represented in FIG. 1 are preferably implemented with silicon-on-insulator (SOI) substrates and processing technology to permit operating temperatures of up to about 260° C. (about 500° F.). As known in the art, SOI substrates typically comprises a thin epitaxial layer on an insulator. The substrate is typically formed by oxidizing one or both bonding surfaces of a pair of semiconductor (e.g., silicon) wafers prior to bonding the wafers. Most typically, a single silicon dioxide layer is grown on an epitaxial layer formed on a silicon wafer. After bonding the wafers, all but the insulator and epitaxial layer (and optionally the silicon layer of the second wafer) are etched away, such that the silicon dioxide layer forms an insulator that electrically isolates the epitaxial layer. A commercial example of solid-state amplifiers implemented on an SOI substrate using SOI processing technology is the HT1104 monolithic quad operational amplifier commercially available from Honeywell. With such high temperature capability, the circuitry 14 can be embedded into one of the passive eddy current sensors 12 or a housing (not shown) containing the sensors 12, preferably without the need for an active cooling system dedicated to maintaining the temperature of the circuitry 14 below 125° C. as required by conventional electronics. The term "active cooling" is used herein to mean cooling systems that are in addition to the sensors 12, the circuitry 14, and their housing (s), and are specifically designed to transfer heat from the circuitry 14 by conduction, convection, and/or radiation.

Figure 2:
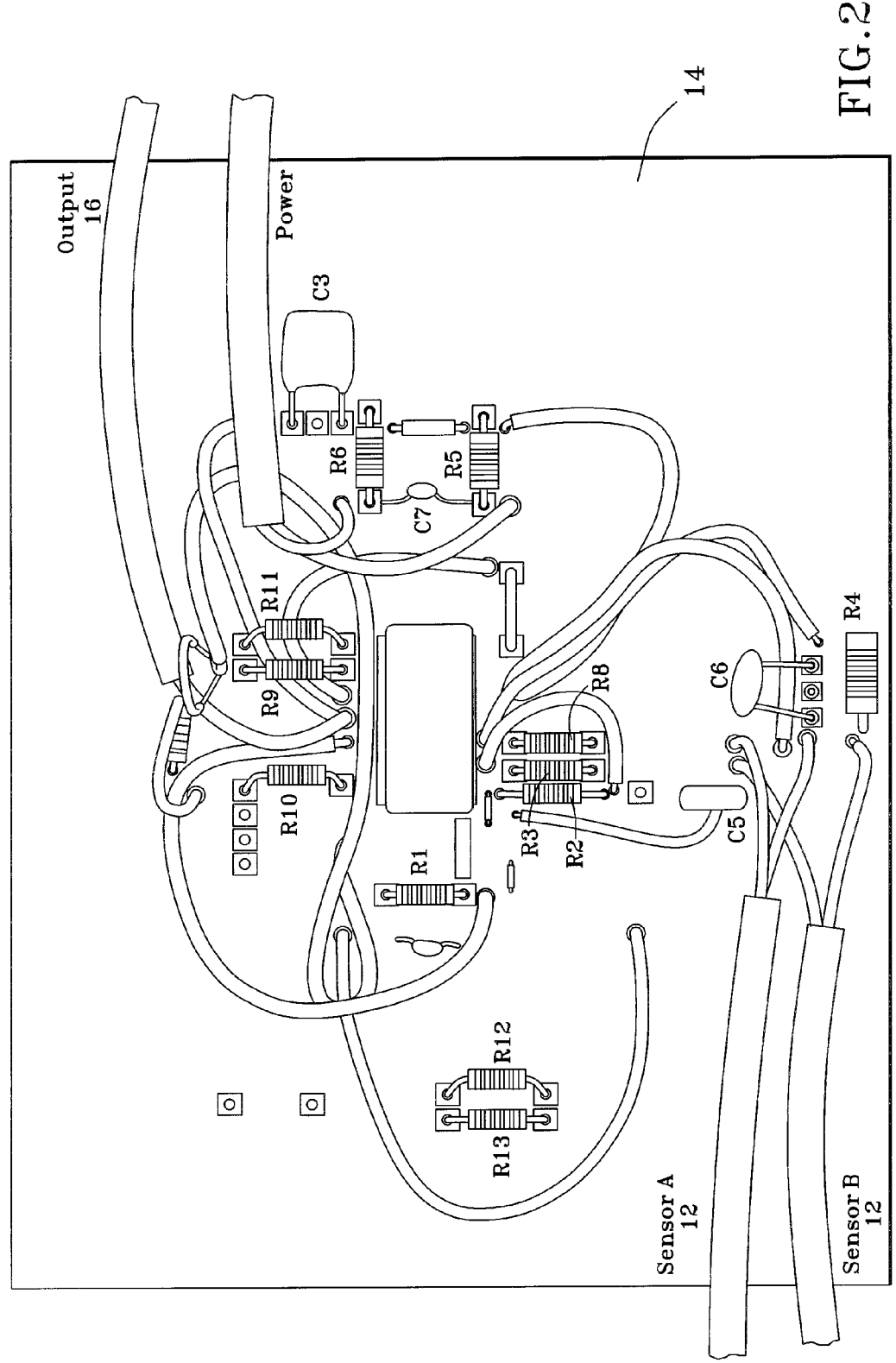
FIG. 2 is a scanned image of a prototype circuit constructed in accordance with the circuitry of FIG. 1.
Figure 3:
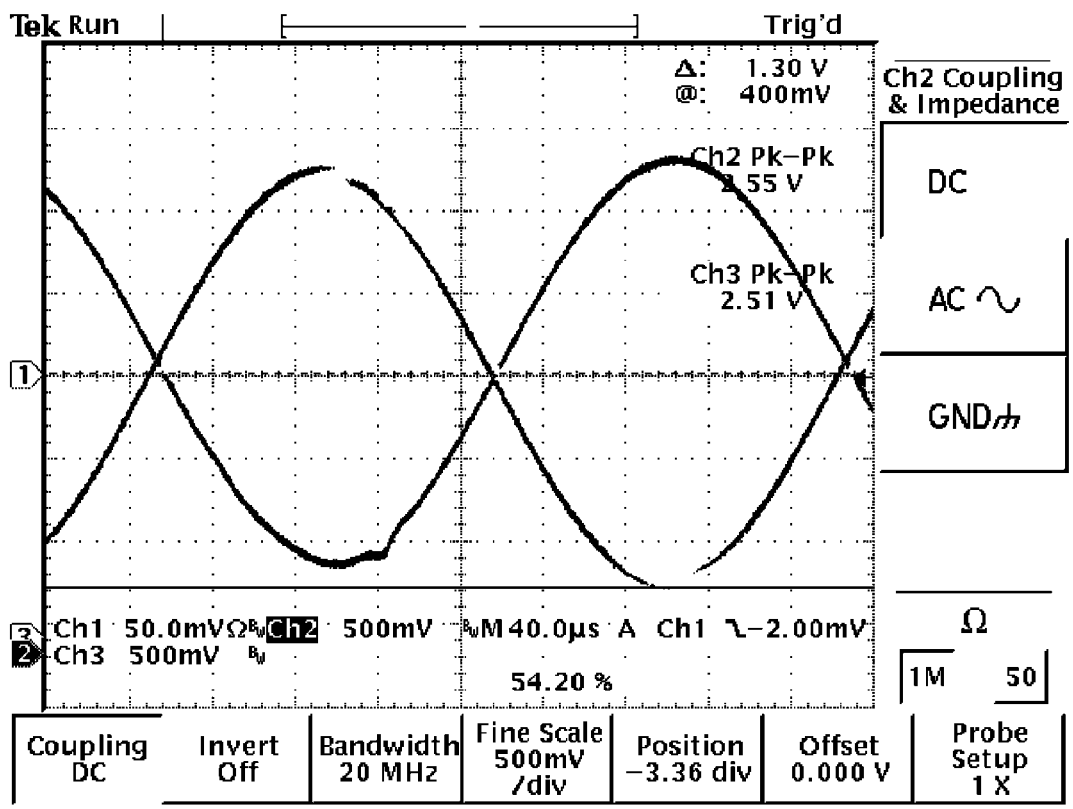
FIG. 3 is a graph showing the outputs of two passive eddy current sensors connected to the circuitry of FIG. 2.

In an investigation leading to the invention, a prototype circuit shown in FIG. 2 was constructed using the Honeywell HT1104 amplifier. Operationally, the prototype circuit was essentially identical to the circuitry 14 schematically represented in FIG. 1. Two identical passive eddy current sensors were connected to the circuit and placed next to a source of EMI. The output of the circuit was then monitored while driving a load to simulate connection to a FADEC. The output of the circuit is shown in FIG. 3, and evidences that the common mode magnetic EMI noise was canceled out by the circuit.

While the invention has been described in terms of a preferred embodiment, it is apparent that other forms could be adopted by one skilled in the art. For example, the electrical values of the components indicated in FIG. 1 are for reference purposes only, and are not to be interpreted as limiting the scope of the invention, the physical configuration of the sensors 12 and circuitry 14 could differ from that shown, and materials and processes other than those noted could be used. Therefore, the scope of the invention is to be limited only by the following claims.

The invention claimed is:

1. A system for sensing the periodic proximity of an object, the system comprising:

passive eddy current means for sensing comprising a first magnet and a first coil-wound core coupled to generate and detect a first magnetic field and a second magnet and a second coil-wound core coupled to generate and detect a second magnetic field, the means for sensing being positioned relative to the object such that the object periodically passes through the first and second magnetic fields, the first and second coil-wound cores producing outputs in response to the object periodically passing through the first and second magnetic fields; and circuitry coupled to the means for sensing and electronically combining the outputs of the first and second coil-wound cores to produce output signals corresponding to the proximity and timing of the object as it periodically passes through the first and second magnetic fields, the circuitry combining the outputs of the first and second coil-wound cores so that common mode signals thereof subtract from each other to eliminate from the output signals any electromagnetic interference noise present in the outputs of the first and second coil-wound cores.

2. The system according to claim 1, wherein the circuitry comprises amplifiers implemented on silicon-on-insulator substrates.

3. The system according to claim 1, wherein the amplifiers have a maximum operating temperature of greater than 125° C.

4. The system according to claim 1, wherein the amplifiers have a maximum operating temperature of at least about 260° C.

5. The system according to claim 1, wherein the object comprises multiple rotating blades of a gas turbine, the system is a blade proximity sensor system installed on the gas turbine, and the means for sensing is located in proximity to the rotating blades.

6. The system according to claim 5, wherein the system lacks an active cooling means for cooling the circuitry.

7. The system according to claim 1, wherein the circuitry and the means for sensing are contained together within a housing.

8. The system according to claim 7, wherein the system lacks an active cooling means for cooling the circuitry.

9. The system according to claim 1, wherein the circuitry further comprises means for low pass filtering.

10. The system according to claim 1, wherein the circuitry further comprises means for differential line driving.

11. A system for sensing the periodic proximity of rotating blades of a gas turbine, the system comprising:
    a sensing unit comprising first and second passive eddy current sensors, the first passive eddy current sensor comprising a first magnet and a first coil-wound core coupled to generate and detect a first magnetic field, the second passive eddy current sensor comprising a second magnet and a second coil-wound core coupled to generate and detect a second magnetic field, the first and second passive eddy current sensors being positioned on the gas turbine such that the rotating blades periodically passes through the first and second magnetic fields and the first and second coil-wound cores produce outputs in response to the rotating blades passing through the first and second magnetic fields; and
    circuitry coupled to the sensing unit and electronically combining the outputs of the first and second coil-wound cores to produce output signals corresponding to the proximity and timing of the rotating blades as they pass through the first and second magnetic fields, the circuitry combining the outputs of the first and second coil-wound cores so that common mode signals thereof subtract from each other to eliminate from the output signals any electromagnetic interference noise present in the outputs of the first and second coil-wound cores.

12. The system according to claim 11, wherein the circuitry comprises amplifiers implemented on silicon-on-insulator substrates.

13. The system according to claim 11, wherein the amplifiers have a maximum operating temperature of greater than 125° C.

14. The system according to claim 11, wherein the amplifiers have a maximum operating temperature of at least about 260° C.

15. The system according to claim 11, wherein the system lacks an active cooling means for cooling the circuitry.

16. The system according to claim 11, wherein the circuitry and the means for sensing are contained together within a housing.

17. The system according to claim 11, wherein the circuitry further comprises means for low pass filtering.

18. The system according to claim 11, wherein the circuitry further comprises means for differential line driving.

19. A method of sensing the periodic proximity of an object, the method comprising:
    locating passive eddy current means for sensing in proximity to the object, the passive eddy current means for sensing comprising a first magnet and a first coil-wound core coupled to generate and detect a first magnetic field and a second magnet and a second coil-wound core coupled to generate and detect a second magnetic field, the means for sensing being positioned relative to the object such that the object periodically passes through the first and second magnetic fields, the first and second coil-wound cores producing outputs in response to the object periodically passing through the first and second magnetic fields; and
    electronically combining the outputs of the first and second coil-wound cores with circuitry coupled to the means for sensing to produce output signals corresponding to the proximity and timing of the object as it periodically passes through the first and second magnetic fields, the circuitry combining the outputs of the first and second coil-wound cores so that common mode signals thereof subtract from each other to eliminate from the output signals any electromagnetic interference noise present in the outputs of the first and second coil-wound cores.

20. The method according to claim 19, wherein the object comprises multiple rotating blades of a gas turbine, the system is a blade proximity sensor system installed on the gas turbine, and the means for sensing is located in proximity to the blades.

* * * * *